United States Patent
Goebbels et al.

(10) Patent No.: US 8,055,480 B2
(45) Date of Patent: Nov. 8, 2011

(54) METHOD FOR REPRESENTING FLEXIBLE ELONGATE VOLUME OBJECTS

(75) Inventors: Gernot Goebbels, Cologne (DE); Martin Göbel, Bonn (DE)

(73) Assignee: ICIDO GmbH, Stuttgart (DE)

( * ) Notice: Subject to any disclaimer, the term of this patent is extended or adjusted under 35 U.S.C. 154(b) by 743 days.

(21) Appl. No.: 11/917,519

(22) PCT Filed: Jun. 14, 2006

(86) PCT No.: PCT/EP2006/005714
§ 371 (c)(1),
(2), (4) Date: Dec. 14, 2007

(87) PCT Pub. No.: WO2006/133921
PCT Pub. Date: Dec. 21, 2006

(65) Prior Publication Data
US 2008/0201114 A1    Aug. 21, 2008

(30) Foreign Application Priority Data

Jun. 16, 2005 (DE) .......................... 10 2005 028 103

(51) Int. Cl.
*G06F 17/50* (2006.01)
(52) U.S. Cl. .......................................................... 703/1
(58) Field of Classification Search ................... 703/1, 6; 345/419
See application file for complete search history.

(56) References Cited

U.S. PATENT DOCUMENTS

| 6,961,683 | B2* | 11/2005 | Kodama et al. | 703/2 |
|---|---|---|---|---|
| 6,970,755 | B2* | 11/2005 | Sakakura et al. | 700/97 |
| 7,024,341 | B2* | 4/2006 | Barrow et al. | 703/1 |
| 7,200,537 | B2* | 4/2007 | Ozaki | 703/7 |
| 7,206,723 | B2* | 4/2007 | Sawai et al. | 703/1 |
| 7,277,833 | B2* | 10/2007 | Kukuk | 703/2 |
| 7,375,726 | B2* | 5/2008 | Kaasa et al. | 345/420 |
| 7,403,876 | B2* | 7/2008 | Tsuchiya et al. | 703/1 |
| 2007/0064016 | A1 | 3/2007 | Hillerin et al. | |

FOREIGN PATENT DOCUMENTS

DE     102004050266     4/2006

OTHER PUBLICATIONS

Ralf Rabaetje, "Real-time Simulation of Deformable Objects for Assembly Simulations", 2003, Australian Computer Society, pp. 1-8.*

(Continued)

*Primary Examiner* — Dwin M Craig
*Assistant Examiner* — Aniss Chad
(74) *Attorney, Agent, or Firm* — Vern Maine & Associates

(57) ABSTRACT

The invention relates to a method for the simplified, physically correct representation of flexible elongate volume objects. The volume object is divided up into sections and each section begins and ends with an interaction point and is connected to an adjacent section by means of said point. Each interaction point has six degrees of freedom and the physical properties of the sections are defined according to several factors. The invention also relates to obtained experimental values which are used to represent another elongate volume object using a model function.

2 Claims, 15 Drawing Sheets

OTHER PUBLICATIONS

Figure 1:
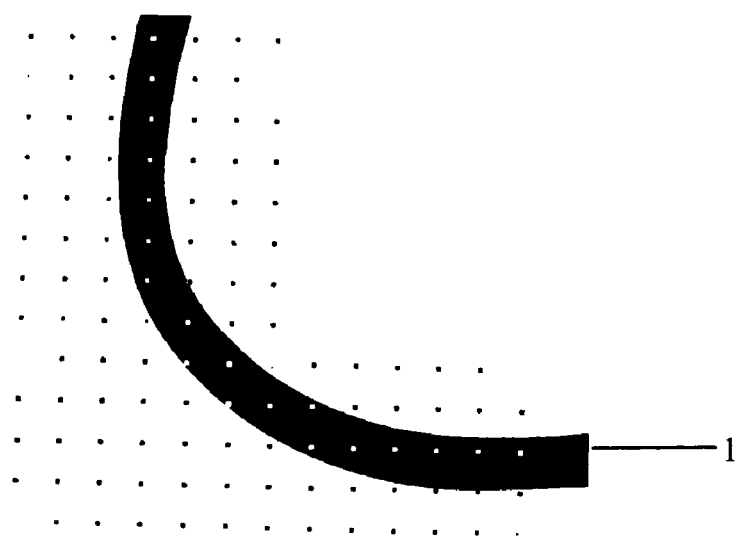

Achim Loock et al., "A Virtual Environment for Interactive Assembly Simulation: From Rigid Bodies to Deformable Cables", 2001, International Institute of Informatics and Systemics, pp. 1-8.*

Hisup Park et al., "Computational Support for Concurrent Engineering of Cable Harnesses", 1992, Computers in Engineering Conference, pp. 1-19.*

J. M. Ritchie et al., "Human in the Loop: The Use of Immersive Virtual Reality to Aid Cable Harness Design", 2002, University of Durham, pp. 109-112.*

PCT Search Report dated Aug. 25, 2006 of Patent Application No. PCT/EP2006/005714 filed Jun. 14, 2006.

Hergenrother et al., "Real-Time Virtual Cables Based on Kinematic Simulation", WSCG, 2000, 8 pages.

Ng, F.M. et al., "Designing Cable Harness Assemblies In Virtual Environments", Journal of Materials Processing Technology, 2000, pp. 37,43, Elsevier Science B.V.

Leon, J.C. et al., "Modelling Flexible Parts for Virtual Reality Assembly Simulations Which Interact With Their Environment", IEEE, 2001, pp. 335-344.

Igarashi, T. et al., "As-Rigid-As-Possible Shape Manipulation", ACM Transactions on Computer Graphics, 2005, 8 pgs., vol. 24, No. 3, ACM Siggraph, Los Angeles.

"Laplace Transform Applied to Differential Equations", Wikipedia, the free encyclopedia, Downloaded May 5, 2011, 2 pgs.

"Runge-Kutta Methods", Wikipedia, the free encyclopedia, Downloaded May 5, 2011, 9 pgs.

* cited by examiner

METHOD FOR REPRESENTING FLEXIBLE ELONGATE VOLUME OBJECTS

The present invention relates to a method for the physically correct representation of flexible elongate volume objects, in particular hoses or cables.

PRIOR ART

The laying of elongate flexible volume objects, in particular hoses or cables, is an essential element in the construction of three-dimensional objects. Such three-dimensional objects can be buildings, machines, and land, air or water vehicles.

Planning the course when laying said elongate flexible volume objects constitutes a substantial problem during the phase of designing and constructing three-dimensional objects. The aim of planning a course is, inter alia, to determine an optimum course of the elongate flexible volume object while including the construction parameters and all the safety parameters. At the same time, the aim is to minimize the lengths of the elongate flexible volume objects to be constructed.

Particularly in mass production, as in vehicle building, minimizing the lengths of the volume objects to be constructed leads to substantial savings in costs. To the extent that the volume object conducts fluid, being in the form of a brake hose, for example, the minimization of the overall length reduces the fluid volumes inside the volume object. Reducing the volumes inside the volume object leads, in turn, to an improved control of the subassemblies to be controlled.

During planning of the course, there is a need to take account of the linking points and connecting points of the subassemblies to be connected, including the fastening points. Fastening points have been understood in the meaning of the present invention as the points where the flexible volume object is fastened in its course on or in the three-dimensional object. Fastening points serve for guiding the course of the flexible volume object. Fastening points can constrain the degrees of freedom of a flexible volume object completely or only in part.

Furthermore, when planning the course of the flexible volume object it is necessary to take account of the spatial and steric conditions on or in the three-dimensional object, there likewise being a need to take account of safety criteria. Thus, for example, cables and hoses must be at sufficient spacing inside the engine compartment from hot subassemblies that are moving and/or cause pinching. If appropriate, the action of gravity must also be included in the case of sagging objects.

According to the prior art, the previously named objects are achieved by means of known computer aided design (CAD) methods, in part by applying FEM (Finite Element Methods) or BEM (Boundary Element Methods), or else by applying geometric methods. The results are, however, inadequate in two respects. Either the known methods have the disadvantage that they do not take account of the physical properties of the respective elongate flexible objects, or they do not satisfy the requirements of interactive planning and design tasks. This relates, in particular, to the respective elastic and flexible properties of the individual objects. Thus, for example, the smallest possible radii of curvature of a hose conducting fluid deviates substantially from those of a clad copper cable. In this case, the smallest possible radii of curvature are to be understood as the radii of curvature that may be selected without leading to functional disturbances.

Additionally, even in the case of elongate flexible objects of the same type such as, for example, hoses, the properties of the latter can differ as a function of the respective parameters such as outside and inside diameters, selected material and others. This latter must, in turn, be taken into account when planning for the course of the flexible volume object.

The basic approach in the case of the use of the FEM to illustrate body properties consists in the reduction of the representation of the properties of the discretized elements, the overall display of the body forming the functional sum of all the individual illustrations. It is important here to fulfill the continuity conditions in the transition between the individual elements.

It holds in principle for the approach by means of FEM that the representation becomes more exact the greater the degree of discretization of the body to be represented. With an increasing number of the elements, the representation approaches the physically correct properties of the body to be represented.

Conversely, raising the number of the elements leads to a disproportionately high rise in the cost of computation in order to represent the body properties. Raising the computational outlay is associated with a raising of the time required. The consequence of the latter is that the results for representing the body properties are made available with a large temporal delay. It is therefore impossible to display in real time.

The background to the latter is the fact that each element has a substantial number of degrees of freedom. Consequently, with each change in the spatial position of the object, that is to say the elongate flexible volume object, it is therefore necessary to recalculate a multiplicity of parameters, the respective interactions between the individual elements needing to be taken into account.

Likewise known is the application of the FEM method that determines in a preprocessing step the complete solution space for an elongate volume object in conjunction with a permanently defined user activity in a time consuming computational step (preprocessing) and illustrates said computational step at a later instant visually (postprocessing). In the case of this known method, the position and the course are determined for the elongate volume object over the entire longitudinal extent thereof. The starting point here is an exact stipulation in each case. This means that a complete and therefore time consuming calculation sequence must be carried out for each variation, the entire course of the elongate volume object being determined or calculated. Otherwise expressed, this means that, for example, when the operator would like to carry out interactive optimization of the optimized course of the elongate flexible volume object in the three-dimensional object, for example, an engine compartment, there is a need to carry out a complete calculation by preprocessing for each individual variant course, and to file it for visual display. In this case, the operator is then finally committed to the courses of the elongate volume object stipulated in the preselection. It follows that he is moving in a coarse selection grid. Staying with this example, given ten preprocessing steps in which ten possible courses of the flexible elongate volume object are calculated by means of the known FEM, the operator can make use only of the above-mentioned and precalculated ten variants of the course in the visualized display. Each further, if only slight change in the course requires a complete recalculation of the course of the elongate volume object.

The disadvantage is obvious: a change in the shape of the elongate volume element, for example, diameter, and also of its properties, for example elasticity and material composition, or a modified interactive mode of procedure on the part of the user requires in each case a renewed performance of this complicated preprocessing step. Furthermore, the operator is committed to the coarse grid of the courses, prescribed in the preprocessing, of the flexible volume object. He can move only in a coarse grid.

The disadvantages of the known CAD methods will be explained with the aid of an example from automobile manufacturing. A virtual model of the vehicle to be built is constructed using the known CAD methods. In this case, the first rough plans, for example relating to the engine compartment, are made for the course of the elongate flexible volume objects to be fitted therein. However, said rough planning is not sufficient for optimization.

In order to optimize the planning of the course of the elongate volume object, a real model is subsequently fabricated with the aid of the virtual model. The real model is used, in turn, by the designer who fits in the elongate flexible volume object by hand. This mode of procedure is time consuming and cost intensive.

It is an object of the present invention to overcome the disadvantages of the state of the art and to provide a method for physically correct display of flexible elongate volume objects. A further object is to provide a method of the type mentioned that enables the determination and display in real time. A further object of the present invention is to provide a method that permits an optimization of speed and/or accuracy in the display as a function of the respective requirements. A further object is to provide a method of the type mentioned that enables a free interaction on the part of the operator.

The objects are achieved in accordance with the technical features of the independent claims.

The present invention provides a method for the physically correct representation of flexible elongate volume objects. The method according to the invention can be subdivided in principle into four method steps. However, this subdivision serves merely to explain the method more effectively.

In the first method step, the flexible volume object to be displayed is split up into individual sections. Each of said individual sections begins and ends with an interaction point denoted as a handle. An interaction point has six degrees of freedom and can be fixed in three-dimensional space or be manipulated in these degrees of freedom by an interactive user. Fixed interaction points are also denoted as fastening points. If, for example, the flexible elongate volume object is a hose that is split up into ten sections, this hose has eleven handles. These interaction points are used for the purpose of virtual laying and the deformation, caused thereby, of the elongate volume elements. The number of the interaction points is arbitrary and can be modified by addition or deletion in all method steps.

The first method step leads to considerable advantages as against the conventional FEM method previously described. Whereas in the case of the conventional FEM method, the elongate flexible volume object is split up in a known way into a multiplicity of smooth polyhedra, and these are then calculated, or their changes are calculated, and so the number of the interaction points that are to be determined and used in accordance with the invention is dramatically reduced.

In the second step of the inventive method, the physical properties of the sections are determined between two handles in each case. According to the invention, the determination of the physical properties is performed by experimental predetermination of the properties of the flexible object to be determined, or of a sufficiently similar object, with subsequent multidimensional tabulation.

In step three of the inventive method, the discrete, that is to say experimental, data obtained in the second step are interpolated in order to determine the shape and the course of the elongate volume object for the entire object, and thus to ensure a continuous change of shape and course of the object for the visualization, following in the fourth step, and operator interaction.

In the fourth step, the physical data of the individual sections that have been determined in steps two and three are merged, and the visualization then follows.

The inventive method is distinguished by ease of handling and in that the operator is able to freely change the course of the flexible elongate volume object, subject to the handles, the physically correct display being performed directly. An interactive procedure in planning laying of flexible elongate volume objects with free selection of the handles is thereby rendered possible for the first time.

As described above, in the first step of the inventive method the flexible elongate volume object to be displayed is provided with handles. The number and positioning of the handles is not restricted in principle, and can, for example, be selected as a function of the flexible object itself that is to be displayed, or of the selected surroundings. The operator is also free to take account of the conditions of the three-dimensional object in which the elongate flexible volume object is to be displayed. For example, in the case of a cable to be displayed in an engine compartment with two fastening points there is a need for at least four handles to be provided—one handle each for the ends of the cable and one handle each for every fastening point.

The operator is now capable of freely selecting the position of the handles, as a function of the conditions of the three-dimensional object, and is also capable of moving them freely in their six degrees of freedom in the following method steps. In order to stay with the previously named example, he can freely select the position of the fastening points of the cable in the virtual engine compartment that has been generated using known methods. In this process, the real time display from step four of the method is used to show the operator whether the course of the cable he has provided is suitable. Conversely, continuing to stay with this example, the operator can detect immediately whether the cable is coming too close to units in the engine compartment or is running over bent edges. In principle, the physically correct course of such a flexible elongate volume object differs from the theoretical ideal course. Specifically, there is a need here also to take account of the physical properties of the real object such as, for example, the sagging under gravity, or the flexural stiffness of the relevant elongate volume element.

Because of the physically correct display of the flexible elongate volume object in real time, the operator is able to carry out immediate corrections, and to optimize the optimum course of the flexible elongate volume object in the three dimensional space in which it is to be arranged.

Furthermore, it emerges that the properties, determined in accordance with the second method step, of the subsections in method steps three and four can be combined to form a physically correct display.

In the second method step, data records are determined in a first substep, and are prepared in a table in a second substep. These data records reproduce the physically correct behavior of the elongate volume object in the subsections. The determination of the data records is performed with the aid of real elongate volume objects. The determination of the data records in the first substep of the second method step can also be located in time before the first method step in the case of carrying out the inventive method.

The method substep for determining the data for this table is described below with the aid of the example of a cable. However, it applies to all elongate flexible volume objects.

The respective curved course of the cable is determined with the aid of a real cable. By way of example, this can come about by laying down onto an underlying surface that is provided with a standardized grid. A millimeter grid, for example, is a suitable grid. Subsequently, the course of the midpoint of the cable on the grid is determined. This is suitably done by means of digital recording and subsequent computerization. Suitable methods are known.

The course of the center line of the cable is necessarily yielded from the points thus obtained, which lie on the center line.

Furthermore, such data records are determined given defined radii of curvature of the real cable and given the determination of the end points of the measured cable section, and are recorded in the table. The previously mentioned data records relate to the two-dimensional course of the cable on a smooth underlying surface. Consequently, further data need to be recorded for the three-dimensional course of the cable. Here, the XYZ of the coordinates of the points on the respective cable are measured in the appropriate way. Such methods are likewise known. Further, equally known methods for experimentally determining these data records can require the use of tracked markers, or be reconstructed in 3-dimensional space using imaging methods.

A tripartite data record for each point in the XY coordinates, XZ coordinates and YZ coordinates is yielded in each case from the measured data thus obtained, which are recorded in the table. The three-dimensional course of the cable is yielded from the sum of the respective measured points of the midpoint of the cable.

The influence of gravity is to be taken into account, if appropriate, as a function of the intended use, that is to say the arrangement in the three-dimensional object. Thus, a long section between two fastening points inside the three-dimensional object leads to sagging in the event of non-rigid components, and thus to a lengthening of the real patch length between the connecting points.

This second step of the inventive method is further explained below with the aid of the exemplary embodiments with reference to the figures.

A real hose 1 is shown in FIG. 1 for the purpose of determining the parameters in accordance with the second method step. Projected thereon is a standard grid with the aid of which the respective central position of the hose is determined. The respective end of the grid at the beginning and at the end of the hose simultaneously constitute the ends of the respective subsection at which the data are obtained.

Figure 2:
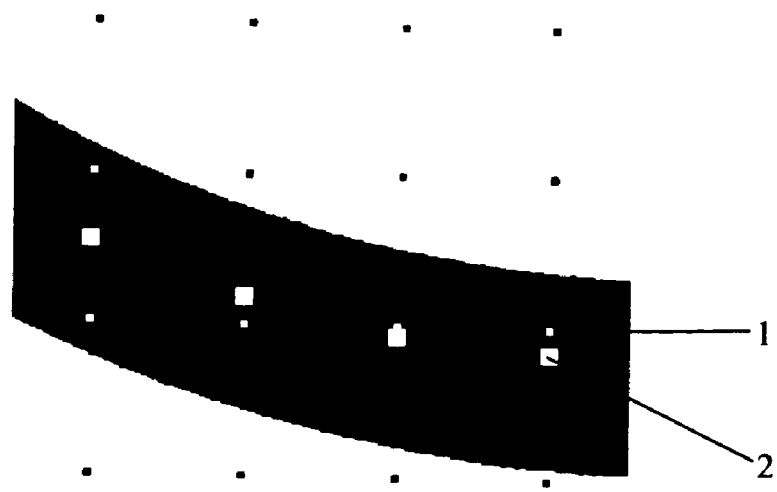

FIG. 2 is an enlargement of the detail in FIG. 1. What is shown is the hose 1 laid down on a standard grid, here on a millimeter scale, the centimeter marks being highlighted as black or white points. The midpoints of the respective hose piece that are calculated in the subsequent method step three are displayed on the hose 1 by squares 2.

The measured data thus obtained for a real three-dimensional volume object are then available for further processing in method step three. The real data obtained are correlated with the flexible elongate volume object to be displayed only to the extent that the real object is an object having substantially the same physical properties. Both the respectively measured radii of curvature and curved courses, and the sections of the real object laid out for measurement do not correspond to the sections between two handles in accordance with the inventive method. Nor is there any direct correspondence between the data of the measured real curved course and the curved course to be determined according to the invention. The data items obtained on the real object in the method step two serve exclusively as basic data record for further processing in steps three and four.

In the third method step, the experimentally obtained values are interpolated in order to ensure a continuous change in shape and course of the elongate volume element for visualization and operator interaction.

The interpolation is carried out by suitably fitting the experimental values with the aid of a defined model function.

The model function, which describes the physically correct form of the elongate flexible volume object, is a function $\vec{r}(t)$ defined by formula (1):

$$\vec{r}(t) = \sum_i c_i \vec{r}_i(t) \qquad (1)$$

$c_i$ being coefficients that are defined by a manipulation, defined by the user, of the handles, and $\vec{r}_i(t)$ being partial results of the linear differential equation in accordance with formula (2).

$$B\vec{r}^{IV} - M\vec{n} \times \vec{r}''' - T\vec{r}'' = \mu \vec{g} \qquad (2)$$

The parameters of the formulas are as follows in this case:
B—Flexural strength
M—Torsional moment
$\vec{n}$—Normal vector that points from the start to the end of the elongate flexible volume object
T—Stress force
µ—Linear density, or mass per unit length
$\vec{g}$—Gravity vector It has emerged that a correct physical display of elongate flexible volume objects is possible on the basis of the model functions found, in the way illustrated in the comparison set forth below of the experimental data with the aid of the interpolation values. The error between the experimental course of an elongate volume object and the method described here is below 2%.

Figure 3:
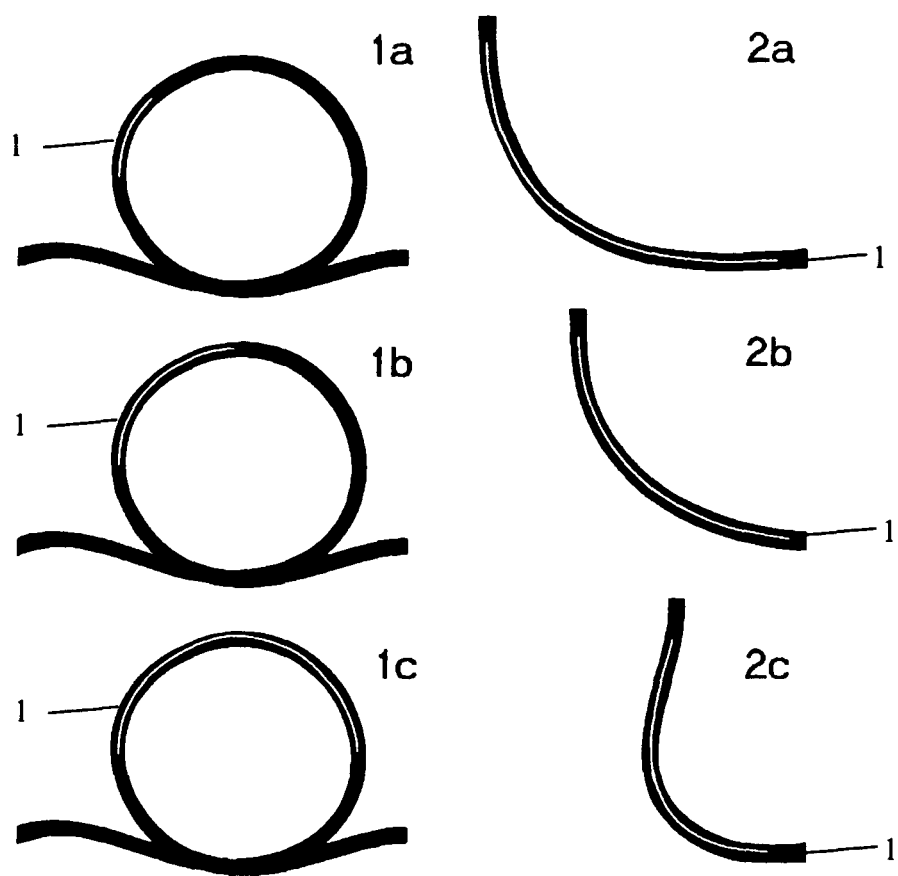
Figure 4:
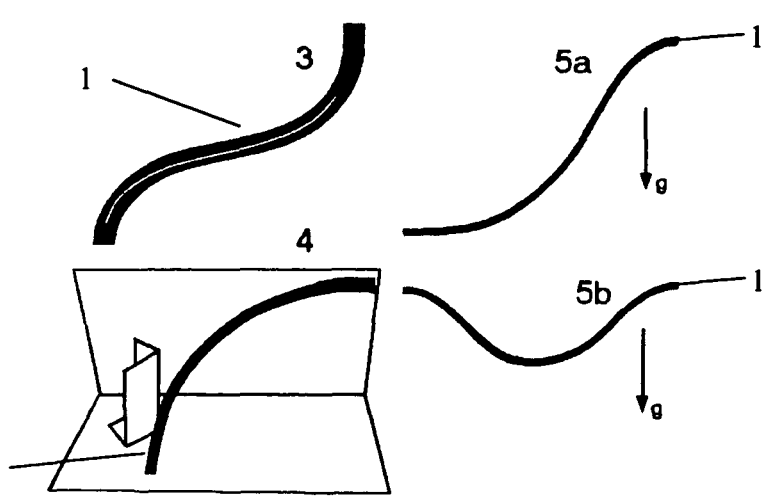

FIGS. 3 and 4 show the associated experiments 1 to 5 by way of example. Here, a photograph of the hose 1 is respectively visible in different positions. Projected thereupon is the line of the course 3 obtained with the aid of the inventive method and in accordance with the calculation using the third method step for respectively one section between two handles. The latter are not illustrated.

The experiments 1a, b and c in FIG. 3 refer to a circular course of the hose. The experiments 2a, b and c refer to a simple curved course with different configurations. Experiment 3 of FIG. 4 shows an S-shaped curved course of the hose with, projected thereon, a course in accordance with the calculation using the inventive method. The projection is to be seen as a white line.

Experiments 4 and 5a and 5b in FIG. 4 show a three-dimensional course of the hose 1, gravity acting on the hose as further component by way of example in experiments 5a and 5b this being represented as a downwardly directed arrow designated by g.

When the handles are manipulated by the operator, the values stored in the table are extracted for the subsections between the handles, selected in a fashion corresponding to the position of the handles, and interpolated and merged, this being carried out in the fourth method step. Finally, the visualization is likewise carried out in the fourth method step.

The advantage of the inventive method as against the prior art is to be seen in that the result can be displayed directly, that is to say in real time, during manipulation by the operator. In the event of a calculation of the complete course of an elongate flexible volume object by means of FEM in a conventional way, a computing time of a number of minutes up to a number of hours is required until the result of the manipulation can be visualized. Furthermore, it emerges that when selecting the guidance of the course of the flexible elongate volume object to be determined, the operator is not tied to a grid, as is the case with the classical FEM method, this grid being formed by selecting the preprocessing steps.

The use of the experimentally confirmed model function in the case of the inventive method therefore in this case permits the deformations of elongate flexible volume objects to be calculated in real time.

As already set forth, in the following step four the results are merged for the purpose of displaying the elongate flexible volume object, and are visualized in a known way. This visualization can be performed, for example, in the form of a display on a screen or a three-dimensional projection. Manipulation of the handles by the operator is possible with the aid of any desired interaction units.

Only the physically correct center line of the volume object to be determined is determined in step three of the inventive method. The volume of the volume object around the center line can be added by means of simple and known display methods for the purpose of visual display. This method step is not necessary in principle, but is advantageous, since it shows the operator a visual display corresponding to a real image. The latter is perceived by the operator to be advantageous as a rule.

Figure 5:
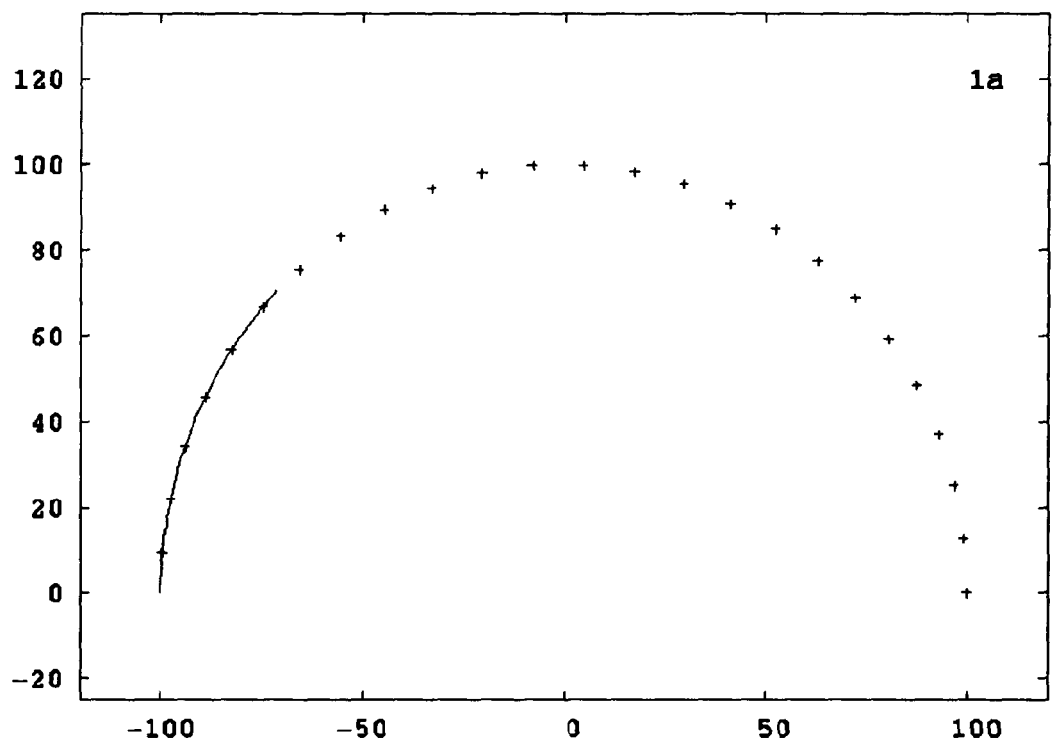
Figure 6:
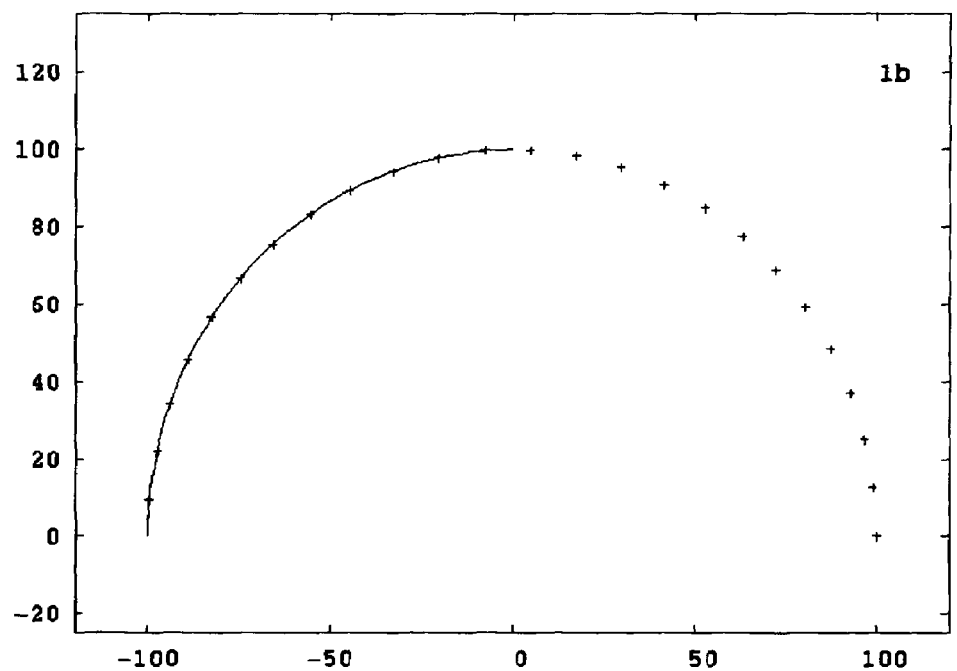
Figure 7:
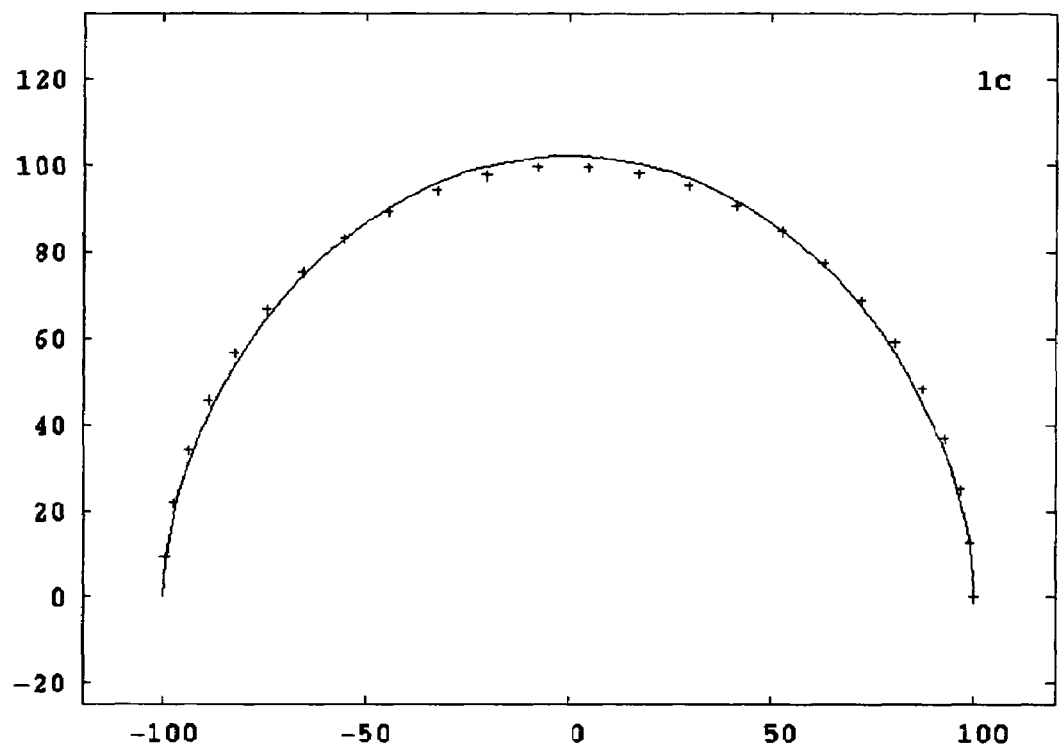

Comparison of experimentally obtained data with data obtained using the inventive method:

FIGS. 5 to 14 compare the experimentally measured data of a course of an elongate volume object with the data that were generated using the inventive method. FIGS. 5, 6 and 7 correspond to experiments 1a, 1b and 1c in FIG. 1. The top semicircles of the course of the hose are illustrated in this case in FIGS. 5, 6 and 7. The experimentally measured values are displayed as crosses. The data obtained using the inventive method are displayed as diamonds. Plotting is in mm on abscissa and ordinate in each case.

The display clearly shows that the data obtained with the inventive method correspond to the data measured experimentally.

Figure 8:
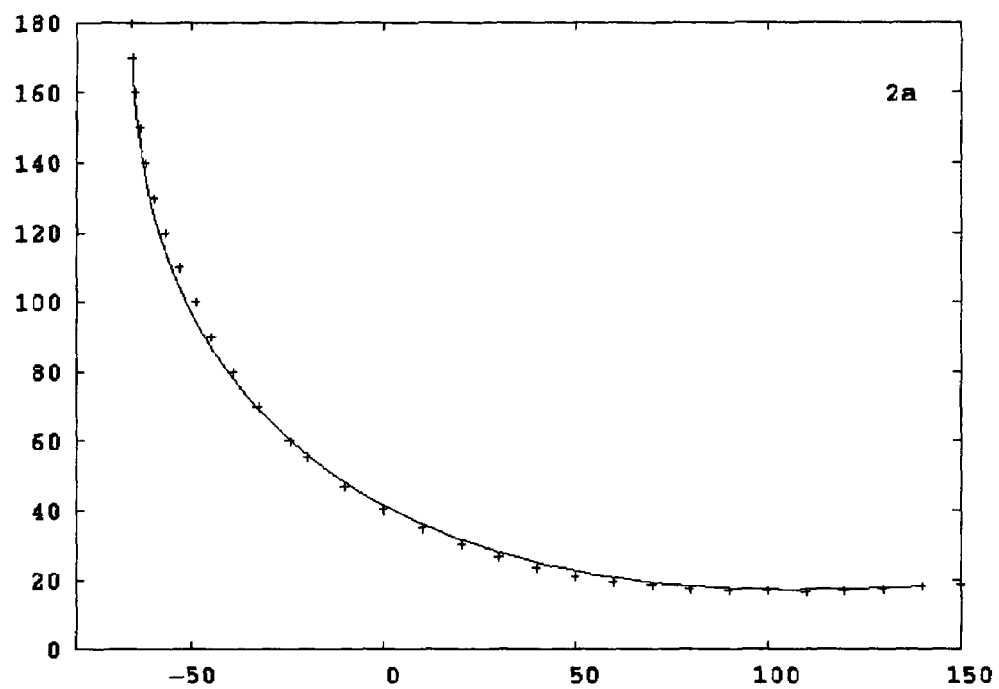
Figure 9:
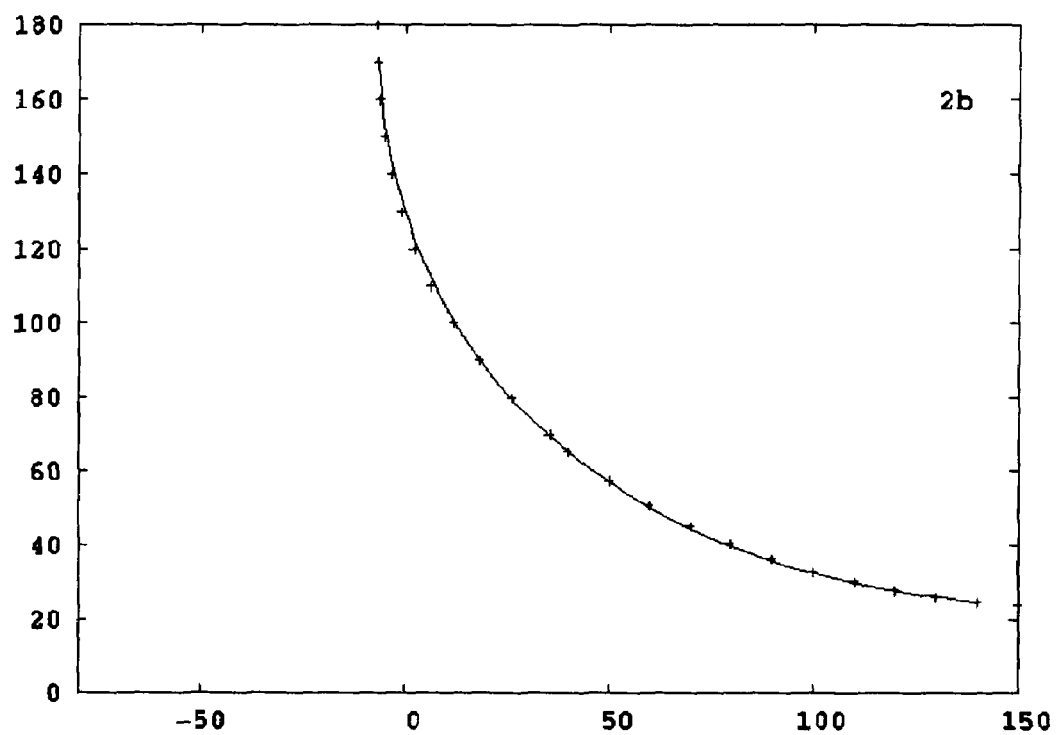
Figure 10:
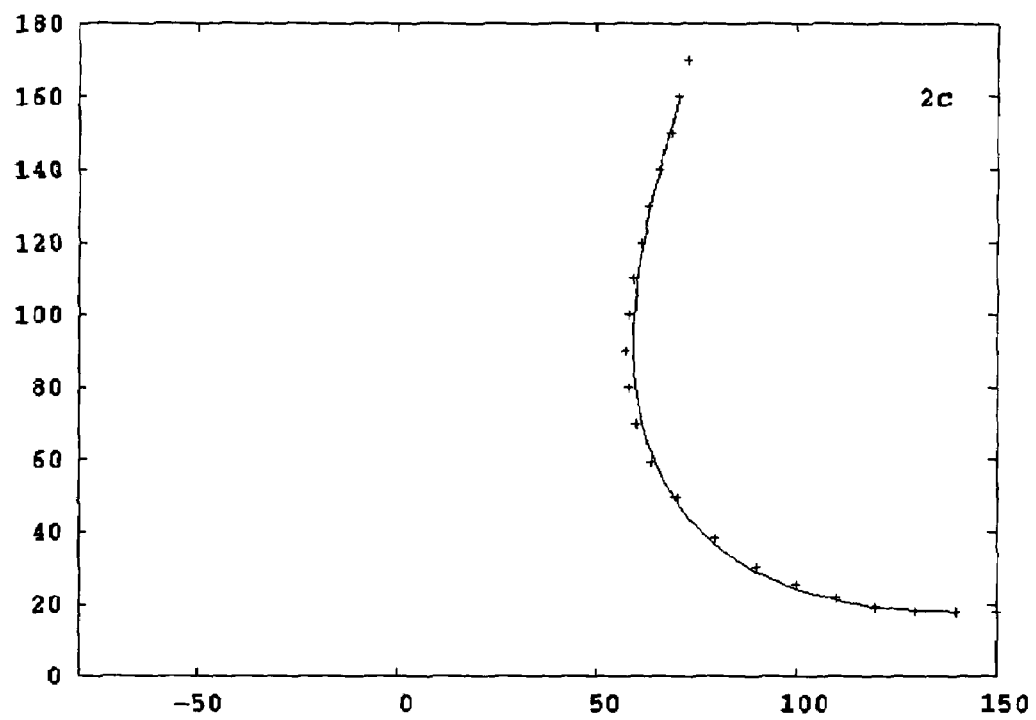

FIGS. 8, 9 and 10 correspond to the experiments 2a, 2b and 2c of FIG. 3. Shown in each case is the identical complete course with experimental data (boxes) and data obtained using the inventive method (crosses).

Figure 11:
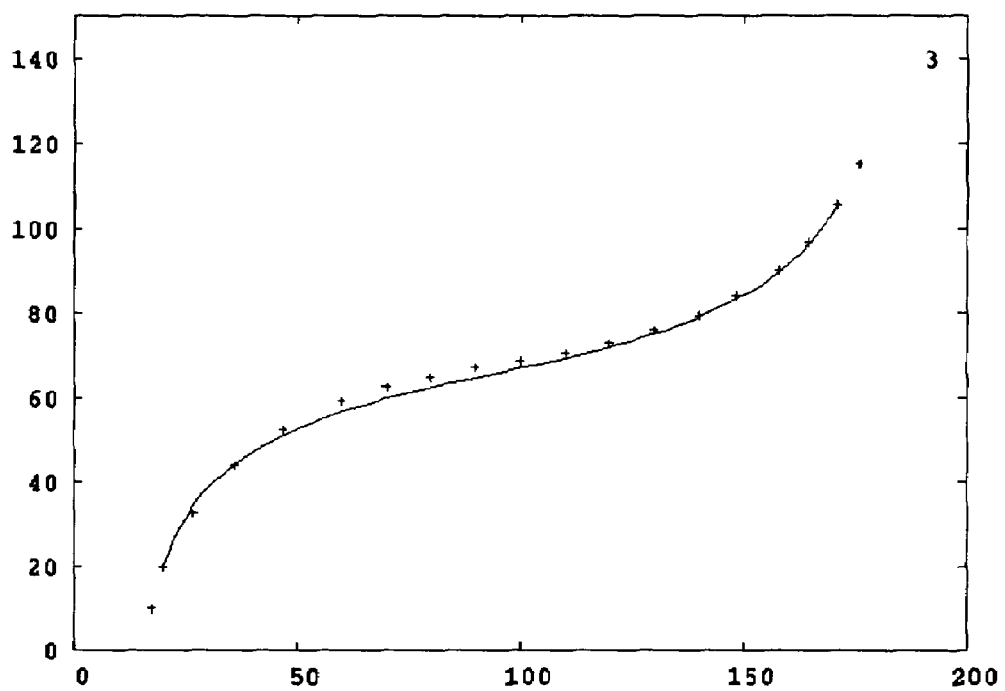

FIG. 11 shows experimental measured data with a two-dimensional display by comparison with the data, obtained with the inventive method, of a course of a hose in accordance with experiment 3 in FIG. 4.

Figure 15:
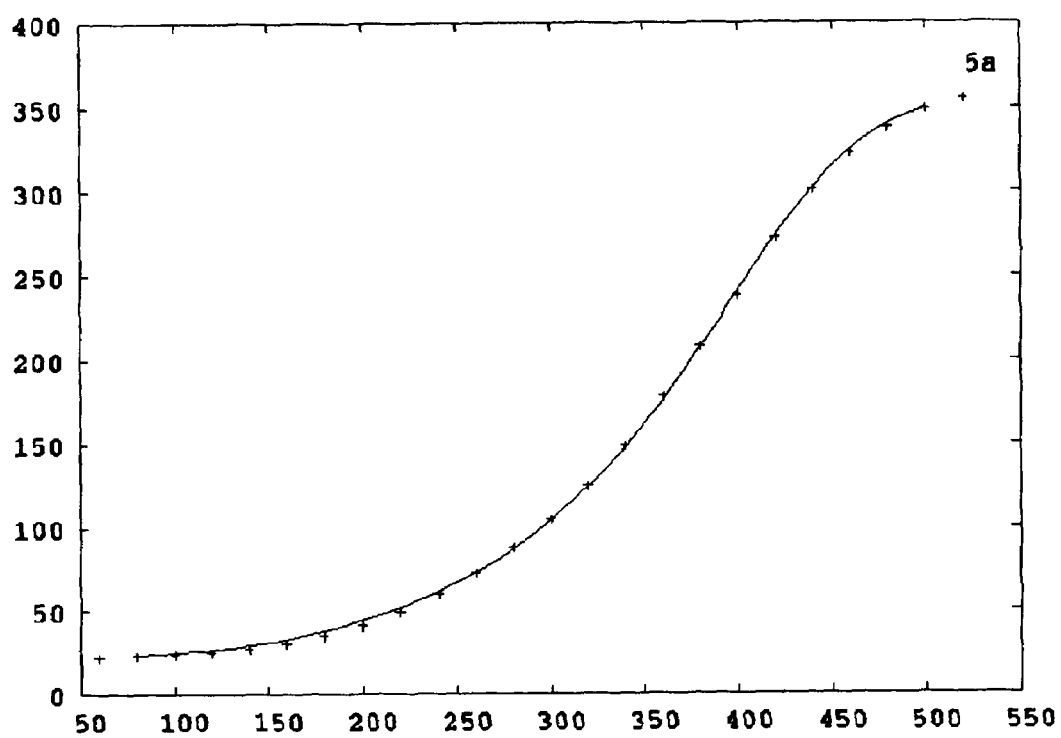
Figure 16:
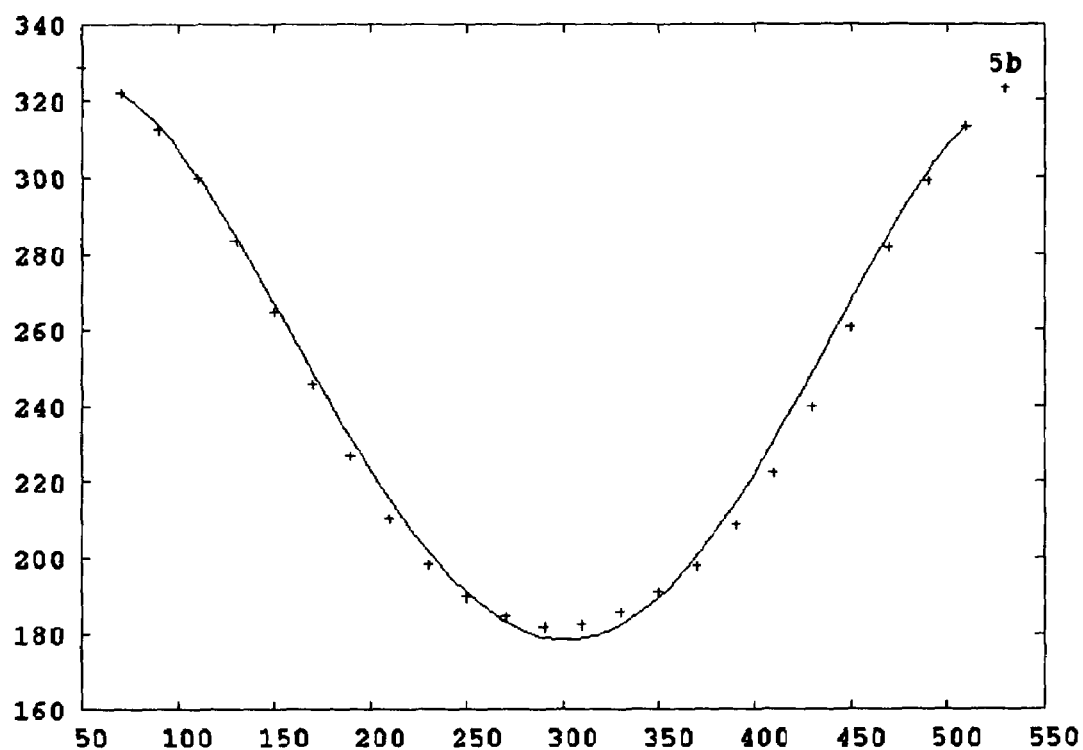

In a corresponding way, FIGS. 15 and 16 are correlated to the experiments 5a and 5b of FIG. 4. In the two-dimensional course of the hose 1, account has likewise been taken here of the gravity vector g.

Figure 12:
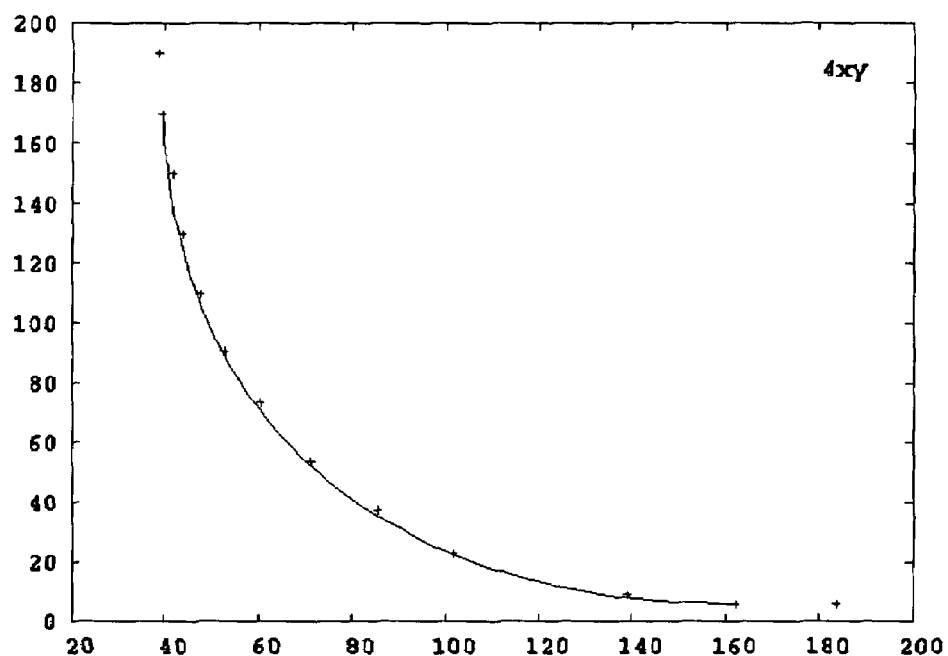
Figure 13:
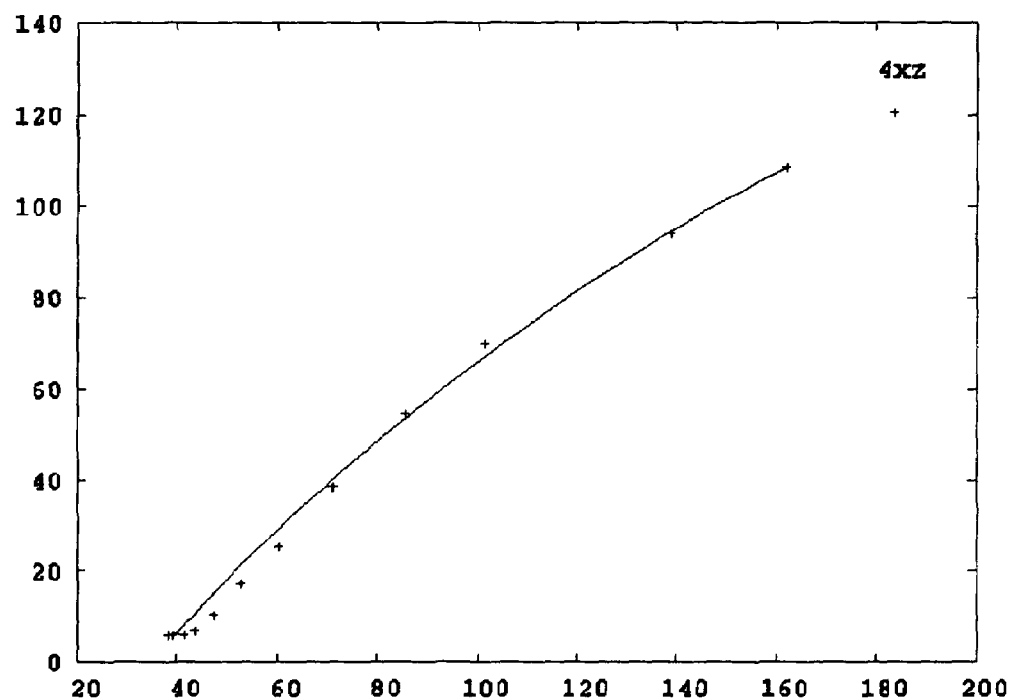
Figure 14:
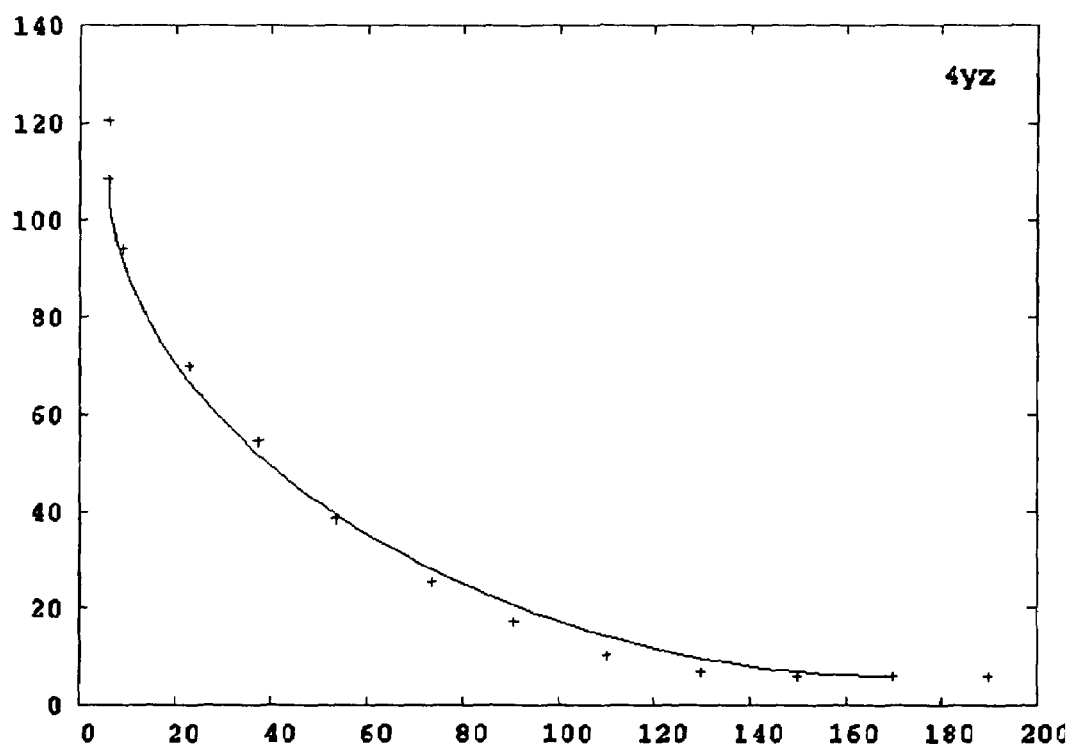

FIGS. 12, 13 and 14 correlate with the experiment 4 of FIG. 4. The experiment 4 of FIG. 4 is a three-dimensional display of a curved course of a hose. FIG. 12 shows the comparison of experimental data and data obtained using the inventive method in the xy plane, FIG. 13 in xz plane and FIG. 14 in the yz plane.

Figure 17:
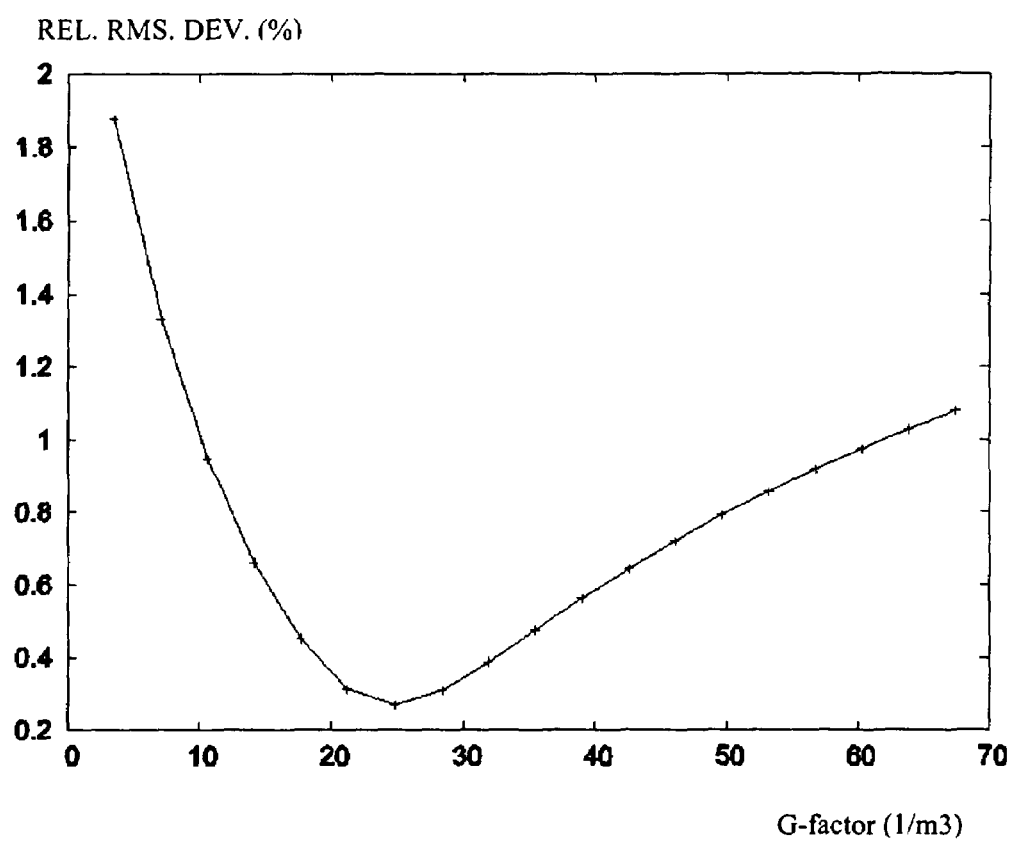

The determination of the factor $G = \mu g/B$ for the application of the gravity vector is illustrated in FIG. 17 with reference to experiment 5a of FIG. 2. In order to determine this factor, the cable course of the experiment 5a was reconstructed with the aid of different values of G (0-70 m$^{-3}$) and compared with the experimentally found cable course. It is to be seen that for the cable used the root of the mean deviations (r.m.s) relative to 0.3% attains the least deviation at G=25 m$^{-3}$, this value for the G factor thereby having been fixed and applied in the above comparison of FIGS. 15 and 16 for the experiments 5a and 5b.

Table 1 summarizes the findings obtained and shows the comparison between the determination of the course of a hose in accordance with the inventive method as against the experimentally obtained data of the real hose. FIGS. 3 and 4 show the associated experiments 1 to 5.

Table 1 shows for the respective experiments, displayed in FIGS. 3 and 4, the deviation between the experimentally measured values and the values of the course of the hose determined with the aid of the inventive method. Different forms of representation of the deviation are presented, firstly as an absolute deviation in mm and secondly as relative deviation in %. In this case, the respective maximum deviation as well as the deviation in the form of the root of the mean squares (r.m.s.) are further shown.

It is to be seen from the results that the display of the course in accordance with the inventive method corresponds to a large extent to the physically correct course.

TABLE 1

|     | Deviation |  |  |  |
| --- | --- | --- | --- | --- |
|     | absolute (mm) | | relative (%) | |
| Exp | max. | r.m.s. | max. | r.m.s. |
| 1a | 0.002 | 0.001 | 0.003 | 0.002 |
| 1b | 0.03 | 0.02 | 0.02 | 0.01 |
| 1c | 2.32 | 1.25 | 0.74 | 0.40 |
| 2a | 2.30 | 1.07 | 0.78 | 0.36 |
| 2b | 0.99 | 0.54 | 0.44 | 0.24 |
| 2c | 1.78 | 0.93 | 0.92 | 0.48 |
| 3 | 2.68 | 1.45 | 1.48 | 0.80 |
| 4 | 3.79 | 2.30 | 1.50 | 0.89 |
| 5a | 3.14 | 1.50 | 0.56 | 0.27 |
| 5b | 6.52 | 3.13 | 1.23 | 0.59 |

The invention claimed is:

1. A computer implemented design method for a physically correct representation of flexible elongate volume objects, characterized in that the method is interactive and real-time, comprising the steps:

in step one, subdividing said volume object into
individual sections, each of said sections beginning and ending with an interaction point, said interaction points used for virtual laying of said volume object,
handles denoting said interaction points, which are manipulateable by an interactive user,
fastening points denoting fixed interaction points,
and connecting each of said sections to a neighboring section via said interaction points, wherein each interaction point has six degrees of freedom, wherein fastening points having one of completely or partially constrained degrees of freedom, said constrainment further being one of permanently prescribed or freely defined;

in step two, performing determination of physical properties between two of said handles based on experimental predetermination of said physical properties, wherein said physical properties of said sections are defined by three-dimensional rasterized position data of a real volume body that reflects plastic properties, said physical properties being flexural strength, stress force, and linear density;

in step three, interpolating said position data of said sections based on a torsional moment, said interpolation performed by fitting experimental values with a model function $$\vec{r}(t) = \sum_i c_i \vec{r}_i(t)$$

wherein $c_i$ being coefficients representing spatial coordinates of a point having said six degrees of freedom that are defined by manipulation $r_i(t)$ being partial results of a linear differential equation in accordance with $$B\vec{r}^{IV} - M\vec{n} \times \vec{r}''' - T\vec{r}'' = \mu\vec{g}$$

wherein
B represents said flexural strength,
M represents said torsional moment,
$\vec{n}$ represents a normal vector that points from a starting end to a terminal end of said volume object,
T represents said stress force,
$\mu$ represents a mass per unit length of said volume object, and
$\vec{g}$ represents a gravity vector;
in step four, merging said physical properties of said sections with said interpolated position data to determine a center line of said volume object, wherein said determined centerline determines a course of said volume object and wherein said determined course deviates from a real course by no more than 2%; and
providing visualization of said volume object.

2. The computer implemented design method of claim 1 wherein interpolating said position data of said sections is further based on said gravity vector, wherein said $\mu$ representing a mass per unit length of said volume object is nonzero.

* * * * *